United States Patent Office 3,192,118
Patented June 29, 1965

3,192,118
CELLULOSE CRYSTALLITES RADIO-
PAQUE MEDIA
Orlando A. Battista, Drexel Hill, and Glen T. Smith, Swarthmore, Pa., assignors to FMC Corporation, Philadelphia, Pa., a corporation of Delaware
No Drawing. Filed Apr. 23, 1964, Ser. No. 362,159
14 Claims. (Cl. 167—95)

This invention relates to radiopaque media and its use in radiography. More particularly this invention relates to fluid radiopaque media and its use in the examination of internal organs of man or animals by radiography.

In the examination of an internal organ of man or an animal for study or diagnostic purposes by means of X-ray and X-ray pictures or radiography and also with fluoroscopy in order to clearly distinguish the outlines of the organ, a radiopaque medium is introduced into the organ. The radiopaque medium prevents or partly prevents the passage of X-rays through the organ and enables an X-ray picture or fluoroscope picture on a screen to be obtained in which the internal organ is more clearly shown as a darker shadow.

One of the first radiopaque materials to be used in diagnosis by radiography was an aqueous suspension of barium sulfate. Although the use of barium sulfate for this purpose has continued and is today widespread, its use is not fully satisfactory for all purposes and is subject to certain limitations and objections. The barium sulfate suspension that is generally used is so dense that it prevents the passage of most of the X-rays directed at it. While it gives a dense shadow in the radiograph, it often masks and does not show the mucosal pattern of the organ. For example, often it does not show or obscures polyps, craters, and underlying lesions or details thereof. The barium sulfate is heavy and in the quantities necessarily used it is difficult to maintain in suspension in water. It tends to settle out with the attendant danger of impaction.

This invention has for its principal object to provide improved radiopaque media for use in examination and diagnosis by radiography and fluoroscopy.

Another object of this invention is to provide improved methods of examination and diagnosis using certain radiopaque media in radiography.

Another object of this invention is to provide radiopaque media that enables clearer radiographs of mucosal and other less dense tissue to be obtained.

A further object of this invention is to provide radiopaque media that are economical and suitable for effective use in all parts of the alimentary tract.

Other objects and advantages of this invention will be apparent from the following description.

This invention in general is an aqueous or oleaginous fluid and either liquid gel or paste-like forms of radiopaque media the degree of radiopaqueness or radiopacity of which may be varied and controlled and the use of those media in radiography. Radiopaque media of this invention comprise cellulose crystallite aggregates. These cellulose crystallite aggregates may be in the form of an aqueous or oleaginous suspension as hereinafter defined and may be used alone or in combination with one or more other radiopaque materials. The cellulose crystallite aggregates in suspension either alone or in combination with other radiopaque materials may be used in various proportions as will be hereafter more fully described to vary or control the degree of radiopaqueness of the radioopaque media as it is used for examination or diagnostic purposes.

The cellulose crystallite aggregates are products obtained by the controlled acid hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose.

In the acid hydrolysis, the acid dissolves amorphous portions of the original cellulose chains, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average length, or of average level-off D.P. values.

The hydrolysis methods noted above are particularly characterized in that in each crystallite aggregate resulting from the hydrolysis, no constituent chain is connected to a chain in a neighboring aggregate; rather all the chains in an aggregate are separate from and free of those in neighboring aggregates.

The cellulose crystallite aggregates, or level-off D.P. cellulose, suitable for use in the invention is characterized by having a preferred average level-off D.P of 125 to 375 anhydroglucose units. The D.P. or degree of polymerization set forth above and hereinafter is measured and determined by the procedure set forth in "Fundamentals of High Polymers," by O. A. Battista, Reinhold Publishing Corporation, New York City, 1958, pages 74 through 80, 106, and 107. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may be thus apparent that the chain length of the level-off D.P. cellulose, or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance with the first preference noted above, at least 85% of this material will be made up of chains containing 50 to 350 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the non-cellulose components of the original material are so effectively destroyed that their concentration is reduced to a very low level. Of interest is the fact that the chains produced by the hydrolysis each have on one end thereof a potential aldehyde group, such group being in the 1 carbon position of an end anhydroglucose unit and requiring the assistance of the ring oxygen atom, which is ortho to it, to realize its aldehydic potential. The group has the reducing properties of an aldehyde group. On their other ends the chains have only hydroxyls as functional groups.

The aggregates resulting from the hydrolysis and washing steps are further characterized by having a particle size in the range of 1 or 2 to 250 to 300 microns, as determined visibly by microscopic examination. By subjecting the foregoing product to a mechanical disintegration, as described below, there is produced a material having a size in the range of less than 1 to about 250 or 300 microns. Within this range, the particle size and size distribution are variable, it being understood that the size and size distribution can be selected to suit a particular end use. In general, mechanically disintegrated particles are preferred.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 350.

Other suitable cellulose crystallite aggregates may have lower average level-off D.P. values, say in the range of 60 to 125, or even 15 to 60. Aggregates from both of these ranges have the chemical purity and other characteristics of the aggregates from the first noted D.P. range. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

In general, the cellulosic source material has a D.P. greater than the level-off D.P. thereof.

As obtained from the acid hydrolysis and water washing steps, the aggregates in the over-all average level-off D.P. range of 15 to 375 are in a loosely aggregated state, particularly in the larger sizes, say from 40 to 250 or 300 microns, and are characterized by the presence of many cracks in their surfaces, including similar surface irregularities or phenomena like pores, depressions, voids, fissures and notches. Because of such irregularities, the apparent or bulk density of the aggregates is much less than their absolute density. Furthermore, the cracks and other irregularities persist despite the application of high compressive forces on the aggregates. Thus, when they are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i. it is 1.38 and 1.38 respectively. On the other hand, the absolute density of a unit crystal or crystallite is 1.55 to 1.57, from which it is apparent that the aggregates occlude considerable quantities of air in the surface cracks, voids, fissures, etc. The apparent densities of the dried disintegrated aggregates, at the compressive forces noted, are somewhat higher than the foregoing values. Of interest in this connection is the fact that the aggregates, dried or never dried, retain their pressed form after compression; in other words, three-dimensional structures of any desired shape may be formed by compressing the aggregate particles.

Either before or after mechanical disintegration the aggregates may be dried. Where the disintegration is performed in the presence of an aqueous medium, drying is preferably carried out after the disintegration step. Drying may be done in any suitable vacuum, or in air at room temperature or higher, going up preferably to 60° C. to 80° C., although the temperature may be up to 100 or 105° C. or higher. Another procedure is to displace the water in the wet aggregates, preferably by means of a low boiling, water-miscible organic compound such as a low molecular weight aliphatic alcohol like methanol, ethanol, propanol, isopropanol, etc., and then to evaporate off the compound. The resulting dried aggregates, as described below, tend to form stable dispersions and gels more readily. Spray drying either in air or in a vacuum is also satisfactory. Spray drying, and also freeze drying and drum drying, are particularly effective to dry the aggregates after the disintegration step. Freeze drying in particular favors the development of a very porous material which is characterized by the presence therein of a multiplicity of pores or depressions of extremely small size; such material readily forms stable dispersions and gels.

Mechanical disintegration of the aggregates, as referred to above, may be carried out in several ways, as by subjecting them to attrition in a mill, or to a high speed cutting action, or to the action of high pressures on the order of at least 5,000 or 10,000 p.s.i. The disintegration of the aggregates is carried out in the presence of a liquid medium, although where high pressure alone is employed, such medium, although desirable, is not necessary. Water is a preferred medium, but other preferably edible liquids are suitable, including sugar solutions, polyols, of which glycerol is an example, alcohols, particularly ethanol, and the like. Whatever method is used, the disintegration is carried out to such an extent that the resulting disintegrated aggregates are characterized by forming a stable suspension in the aqueous medium in which they are being attrited, or in which they may be subsequently dispersed. By a stable suspension is meant one from which the aggregates will not settle out but will remain suspended indefinitely, even for periods measured in terms of weeks or months. The disintegrated aggregates are further characterized by the fact that such suspension forms an extremely adherent film when deposited on a glass panel or sheet or other suitable surface. At lower concentrations of aggregates, the suspension is a dispersion, while at higher concentrations it is a gel. It will be understood in this connection, that for the purposes of this invention the term suspension includes both a dispersion and a gel; the latter expressions being defined below.

The preferred disintegration method is to attrite the aggregates by means of a high speed cutting action in the presence of an aqueous medium. The aggregates may be in a dry or never-dried state prior to attrition, although some water should be present during the cutting or shearing of the particles. If they are initially in the never-dried or wet state, that is, as received from the water washing step, they have a moisture content of at least 40% by weight, and it is possible to attrite them without further addition of water, although water may be added if desired. In any event, it is preferred that the water content of the mixture undergoing attrition should be at least 10 to 15 to 20% by weight. The aggregates content of the mixture to be attrited is preferably at least 3% by weight, and desirably is higher as the efficiency of the cutting action increases with the aggregates content.

Suitable consistencies are those of mixtures containing up to about 35% by weight of aggregates and the balance water; such mixtures lend themselves well to good attrition and are convenient to handle both during and after the disintegration; they also have the advantage of directly producing a gel. At consistencies above 35%, say from 35 to 70%, attrition produces a material which, in the lower end of this range, resembles mashed potatoes of relatively soft or mushy appearance, and as the concentration increases, the material acquires a progressively firmer and drier appearance and consistency; above 50% the material tends to become crumbly. Although the attrited products of consistencies above 35% are not gels, they have the distinctive property of forming indefinitely stable, smooth gels of varying thickness and striking appearance upon the addition of water and stirring manually, as with a spoon, for a few minutes. At about 80% consistency, attrition results in a damp but free flowing material comprising discrete grains or granules and clumps of grains; the moisture content is apparent to the touch rather than the eye; and the material forms a gel upon being manually stirred or beaten in water. At 80 to 90% consistency, the product of attrition is a crumbly, free flowing, grainy, dry-appearing material that does not have a damp feel and which requires energetic beating in the presence of water to form a gel.

It may be useful to review briefly the characteristics of the dispersions and gels. They comprise attrited products of an attritable mixture having a solids content of at least 3% by weight during the attrition step. Necessarily, the resulting attrited product will also have at least 3% solids, although, as indicated, some useful materials are obtainable by diluting such attrited product to a consistency of 2% solids, or even 1%, to form a stable dispersion. In the next place, at least 1% by weight of solids in the product of attrition have a particle size of up to 1 micron. In the third place, the attrited product, in dispersion or gel form, forms substantially adherent films, preferably substantially continuous and self-supporting films, when applied to a suitable surface. Finally, the attrited product is, or forms, a stable and homogeneous colloidal dispersion or gel, the term "homogeneous" referring to the uniform visual appearance of the dispersion or gel. With respect to the last mentioned characteristic, it will be understood, as described, that attrited products having more than about 35% solids, although not gels, will easily form a gel upon manual stirring in water. It should also be understood that stable, homogeneous, colloidal dispersions and gels, as contemplated herein, are free of layers or sediment; there is no bottom layer of sediment; nor is there a top layer of visibly lower solids content than the balance of the mixture. Rather, the stable dispersions and gels are uniform and homogeneous throughout; have a uniformly white color, some mixtures being more, or less, intensely white than others, depending on the aggregates content and particle size distribution; and are further characterized by having a very smooth butterlike mouth feel. The preferred dispersions and gels are those that are stable for at least a month, and another preferred group comprises those stable for at least a week. Dispersions and gels that are stable for at least a day, or even an hour, or less, are also useful for some purposes, as where they are to be used almost immediately. But as may be apparent, the more stable dispersions and gels have the advantage of being storable for a considerable period of time.

Generally, the concentration of aggregates in the aqueous dispersions is at least 3% by weight, and more preferably at least 4 or 5%. It is possible to make stable homogeneous dispersions having a solids content of up to 6 to 8% by weight, although more usually the solids range from 3 to 6%. In the case of gels, the aggregates content varies from 3 or 4% to about 30 or 35% by weight, the upper concentration being limited only by the capacity of the gel to be handled or worked. The concentration both of dispersions and gels may be varied not only by varying the consistency of the attritable mixture but also by adding water to the dispersion or gel, and, less preferably, by evaporating water therefrom. Usually the gels are thixotropic when they contain about 8 to 10% by weight, or more, of the aggregates. As may be apparent, the more concentrated dispersions may have a solids content which overlaps that of the less concentrated gels. The fact that gels are obtaintable at concentrations as low as 3 or 4% solids is explainable by the presence of considerable amounts of aggregates of a particle size of substantially 1 micron and less, it having been found that gel formation is favored as the concentration of these fine particles increases. In fact, at concentrations as low as about 3% solids, gels are obtainable which are thixotropic provided the aggregates are substantially all of 1 micron size and less.

For the purposes of the invention, a dispersion is defined as having about 1 to 8% by weight of the aggregates dispersed in the aqueous or other liquid, and the latter constitutes the continuous phase of the mixture. The dispersion has the physical form or appearance of a liquid, and is flowable like a liquid. A gel is defined as having about 3 to 35% by weight of aggregates dispersed in the aqueous or other liquid, and in this case the aggregates constitute the continuous phase of the mixture. The gel has the physical form of a jelly, paste, plastic mass or the like. As noted both dispersions and gels are included by the term suspension.

Following the mechanical disintegration of the aggregates, the resulting product, whether a dispersion or gel, may be taken and used as such; or it may be de-watered and dried; or it may be desirable to fractionate it into fractions having a more uniform particle size and size distribution. If the product is a mixture containing 35 to 90% solids, it may be stirred in water to form a gel, and the latter is handled as indicated. The dried products are also redispersible in aqueous media by the help of agitation, such as provided by a Waring Blendor, to form dispersions and gels.

In respect of the drying of the gels, it should be observed, first of all, that the preferred gels are those obtained by attriting the never-dried hydrolysis product; these gels have very desirable qualities in respect of smoothness, mouth feel, firmness, storage characteristics, etc. They may be dried to any practical moisture content, in which state they are redispersible in water, by the aid of a suitable attrition step, to form a gel, and this latter gel may again be dried if desired and again redispersed to form a subsequent gel. Gels are also obtainable by attriting the dried hydrolysis product, and these gels may be dried and attrited in again form gels. For producing the dried products, a number of drying procedures are available, and while redispersible materials result from each procedure, some procedures are more advantageous than others, as indicated. For example, freeze drying, spray drying, drum drying, and drying by solvent displacement each produce a material which has an appreciably lower bulk density than conventionally oven-dried materials, with freeze drying producing the lowest bulk density by far, viz., 9.8 lbs./cu. ft. as against 14.1 lbs./cu. ft. for oven-dried aggregates; and such procedure produces a material which is more easily redispersible in water, by the aid of an attrition step, to form a stable suspension than air or oven-dried materials. Freeze-dried, spray-dried, drum dried, and solvent displacement-dried materials are noticeably softer to the touch than products of the other drying steps; and freeze drying also produces a more porous product. With regard to the mouth feel of the various materials, those made by freeze drying, spray drying, and drum drying, are superior.

Fractionation of the attrited products may be accomplished by means of such separation procedures as mechanical sifting, settling in water, or centrifuging, a number of useful fractions being obtainable, including fractions having a particle size of up to 0.2, 1, 2, 5, or 10 microns. Still another desirable fraction is one whose dimensions are all below 100 microns, or below 40 or 50 microns; a fraction in the range of about 40 to 250 or 300 microns is of special interest because of the finding that particles in this size range, particularly those having one or two dimensions of up to 250 or 300 microns, tend to have cracks, fissures, notches, voids, depressions, pores, and the like in their surfaces. Preferably, each dimension of the particles should be within the size range noted for each fraction; however, particles having two dimensions within the size range are quite useful, as are particles having but one dimension within the size range although they are less preferred.

In forming the radiopaque of the cellulose crystallite aggregates alone in accordance with this invention either the disintegrated or the non-disintegrated larger particle size of the aggregates may be used. The aggregates are stirred into water or other aqueous liquid which may contain a flavoring material to render it more palatable for oral administration. Such a liquid may be ginger ale, lemonade, milk, chocolate-flavored milk or the like. For use in examining certain organs of the body, the liquid in which the cellulose crystallite aggregates are dispersed may be an oil, oleaginous or an oily substance. The disintegrated cellulose crystallite aggregates may be stirred into the aqueous liquid or the cellulose crystallite aggregates may be disintegrated in the aqueous liquid.

For most radiographic purposes an aqueous radiopaque containing from 15% by weight to greater amounts of the cellulose crystallite aggregates is found suitable. For use as a radiopaque where denser shadows in the radiograph are desired, a concentration of from 18 to 20% by weight or greater is found preferable.

The aqueous radiopaque may vary from a relatively thin aqueous suspension to a relatively viscose thick smooth gel-like or paste-like suspension depending on the amount, average particle sizes, and particle size distribution of the cellulose crystallite aggregates.

A radiopaque containing 20% cellulose crystallite aggregates alone is found to be substantially equivalent to and is as effective for radiographic purposes as the conventional barium sulfate radiopaque containing approximately 11% by weight barium sulfate that is widely used.

The cellulose crystallite aggregates may be mixed or associated with one or more other radiopaque materials such as the water-insoluble metal salts, oil-soluble or oleaginous radiopaque materials and water-soluble radiopaque materials. These include for example materials such as the following:

barium sulfate
bismuth subnitrate
iodized and chlorinated peanut oil
lipoiodine dissolved in sesame oil
colloidal solution of thorium dioxide
lopanoic acid
3,5 diacetamido-2,4,6-triiodobenzoate
3,5 diiodo-4-pyridon-N-acetic acid diethanolamine
disodium N-methyl-3,5-diiodo-chelidamate
sodium tetraiodophenolphthalein
beta-(4-hydroxy-3,5-diiodophenol) alpha-phenylpropionic acid
2,4-dioxo-3-diodo-6-methyl tetrahydropysidine-N-acetic acid diethanolamine salt
sodium ortho-iodohippurate dihydrate
sodium salt of monoiodomethanesulfonic acid
disodium N-methyl-3,5-diiodo-4-pyridone-2,6-dicarboxylate In associating these cellulose crystallite aggregates with another radiopaque material, the aggregates and the other material are intimately associated by thorough mixing, milling, grinding or the like. The aggregates and the other radiopaque material may be mixed together before added to the water or other liquid vehicle or they may be mixed together in the liquid. The cellulose crystallite aggregates may be treated with or suspended in a soluble form of the other radiopaque material and then the other radiopaque material may be precipitated in or around the cellulose crystallite aggregates. For example the cellulose crystallite aggregates may be dispersed in barium chloride solution of the required concentration. Sulfuric acid is then added in sufficient amount and the barium sulfate is precipitated out of solution in and around the cellulose crystallite aggregates.

If the other radiopaque material is an oil or oleaginous, it may be first absorbed on the cellulose crystallite material. Due to the pores and fissures in the cellulose crystallite aggregates, they have a high affinity for oil or oleaginous materials. The cellulose crystallite aggregates containing the oil or oily radiopaque may then be dispersed or suspended in the liquid vehicle in which they are used.

The water-soluble radiopaque material may be added to the liquid in which the cellulose crystallite aggregates are to be suspended, either before or after the cellulose crystallite aggregates are added to it. If desired, the water-soluble radiopaque may be absorbed by the cellulose crystallite aggregates and then suspended in water.

The radiopaqueness or radiopacity of the radiopaque medium is determined and controlled by the amount of the cellulose crystallite aggregates present when used alone or the amount of the cellulose crystallite aggregates and/or the other radiopaque material when the combination is used.

When another radiopaque is used with the cellulose crystallite aggregates, part of the normal dosage or amount of the other radiopaque that is normally used is in effect replaced by the cellulose crystallite aggregates. For most radiographic purposes from 10 to 90% of the amount of the other radiopaque material may be replaced by the cellulose crystallite aggregates. The amount of the cellulose crystallite aggregates that is used in making up the combination radiopaque is preferably at least 1% by weight of the total radiopaque medium as it is used and is such that sharp clear radiographs are obtained.

The radiographic effect of the cellulose crystallite aggregates when used with another radiopaque is much greater than the radiographic effect of the same amount of cellulose crystallite aggregates would be if used alone. The cellulose crystallite aggregates serve in effect as a synergist in the radiopaque.

The following examples of radiopaque compositions are illustrative of the invention:

*Example I*

A radiopaque medium composed of cellulose crystallite aggregates suspended in water, the amount of the cellulose crystallite aggregates present being 15% by weight of the total radiopaque medium.

Example II

A radiopaque medium composed of cellulose crystallite aggregates suspended in water, the amount of the cellulose crystallite aggregates present being 20% by weight of the total radiopaque medium.

Example III

A radiopaque medium composed of a mixture of 90 parts by weight of cellulose crystallite aggregates and 10 parts by weight of barium sulfate suspended in water, the amount of the mixture of the cellulose crystallite aggregates and the barium sulfate present being 20% by weight of the total radiopaque medium.

Example IV

A radiopaque medium composed of a mixture of 90 parts by weight of cellulose crystallite aggregates and 10 parts by weight of barium sulfate suspended in water, the amount of the mixture of the cellulose crystallite aggregates and the barium sulfate present being 11% by weight of the total radiopaque medium.

Example V

A radiopaque medium composed of a mixture of 50 parts by weight of cellulose crystallite aggregates and 50 parts by weight of barium sulfate suspended in water, the amount of the mixture of the cellulose crystallite aggregates and the barium sulfate present being 20% by weight of the total radiopaque medium.

Example VI

A radiopaque medium composed of a mixture of 50 parts by weight of cellulose crystallite aggregates and 50 parts by weight of barium sulfate suspended in water, the amount of the mixture of the cellulose crystallite aggregates and the barium sulfate present being 11% by weight of the total radiopaque medium.

Example VII

A radiopaque medium composed of a mixture of approximately 0.11 part by weight of sodium 3,5 diacetamido 2,4,6 triiodobenzoate and approximately 10.89 parts by weight cellulose crystallite aggregates suspended in water, the amount of the mixture of the sodium 3,5 diacetamido 2,4,5 triiodobenzoate and the cellulose crystallite aggregates being 11% by weight of the total radiopaque medium.

Example VIII

A radiopaque medium composed of a mixture of approximately 0.275 part by weight sodium 3,5 diacetamido 2,4,6 triiodobenzoate and approximately 10.725 parts by weight cellulose crystallite aggregates suspended in water, the amount of the mixture of the sodium 3,5 diacetamido 2,4,6 triiodobenzoate and the cellulose crystallite aggregates being 11% by weight of the total radiopaque medium.

Example IX

A radiopaque medium composed of a mixture of approximately 0.55 part by weight sodium 3,5 diacetamido 2,4,6 triiodobenzoate and approximately 10.45 parts by weight cellulose crystallite aggregates suspended in water, the amount of the mixture of the sodium 3,5 diacetamido 2,4,6 triiodobenzoate and the cellulose crystallite aggregates being 11% by weight of the total radiopaque medium.

Example X

A radiopaque medium composed of a mixture of approximately 0.2 part by weight sodium 3,5 diacetamido 2,4,6 triiodobenzoate and approximately 19.8 parts by weight cellulose crystallite aggregates suspended in water, the amount of the mixture of the sodium 3,5 diacetamido 2,4,6 triiodobenzoate and the cellulose crystallite aggregates being 20% by weight of the total radiopaque medium.

Example XI

A radiopaque medium composed of a mixture of approximately 0.50 part by weight sodium 3,5 diacetamido 2,4,6 triiodobenzoate and approximately 19.5 parts by weight of cellulose crystallite aggregates suspended in water, the amount of the mixture of the sodium 3,5 diacetamido 2,4,6 triiodobenzoate and the cellulose crystallite aggregates being 20% by weight of the total radiopaque medium.

Example XII

A radiopaque medium composed of a mixture of approximately 1.0 part by weight sodium 3,5-diacetamido 2,4,6 triiodobenzoate and approximately 19 parts by weight cellulose crystallite aggregates dispersed in water, the amount of the mixture of the sodium 3,5 diacetamido 2,4,6 triiodobenzoate and the cellulose crystallite aggregates being 20% by weight of the total radiopaque medium.

The other radiopaques may be used with the cellulose crystallite aggregates in substantially the same manner. The cellulose crystallite aggregates may in effect replace from approximately 10 to 90% of the weight of the other radiopaque that would otherwise be used alone.

The radiopaque medium comprising the aqueous or oleaginous vehicle is administered either orally or is introduced into the alimentary tract by means of a tube. To insure close contact or adherence of the radiopaque medium to the mucosa an edible wetting agent may be added to the aqueous radiopaque medium. A wetting agent such as sorbitan monolaurate reacted with ethylene oxide or other material such as sold under the brand name Tween is suitable.

In the practice of this invention the X-ray equipment, film or fluoroscope screen and the procedure for taking the radiograph such as the time of exposure, positioning the person or animal and the like is the same as that used in the conventional and accepted radiographic practice.

While preferred embodiments of the invention have been disclosed and described, it is to be understood that changes and variations may be made without departing from the spirit and scope of the invention except as defined in the appended claims.

We claim:

1. A radiopaque medium comprising a stable homogeneous liquid suspension of from 3 to 35% by weight of cellulose crystallite aggregates having an average level-off D.P. of 15 to 375 anhydroglucose units and another radiopaque material, said liquid selected from the group consisting of aqueous and oleaginous liquids.

2. A radiopaque medium comprising a stable homogeneous liquid suspension of from 3 to 35% by weight of cellulose crystallite aggregates having an average level-off D.P. of 15 to 375 anhydroglucose units, said liquid selected from the group consisting of aqueous and oleaginous liquids, and a radiopaque water-insoluble metal salt selected from the group consisting of barium sulfate and bismuth subnitrate.

3. A radiopaque medium comprising a stable homogeneous liquid suspension of from 3 to 35% by weight of cellulose crystallite aggregates having an average level-off D.P. of 15 to 375 anhydroglucose units, said liquids selected from the group consisting of aqueous and oleaginous liquids, and barium sulfate.

4. A radiopaque medium comprising a stable homogeneous liquid suspension of from 3 to 35% by weight of cellulose crystallite aggregates having an average level-off D.P. of 15 to 375 anhydroglucose units, said liquid selected from the group consisting of aqueous and oleaginous liquids, and an oleaginous radiopaque material.

5. A radiopaque medium comprising a stable homogeneous liquid suspension of cellulose crystallite aggregates having an average level-off D.P. of 15 to 375 anhydroglucose units, said liquid selected from the group consisting of aqueous and oleaginous liquids, and barium sulfate, the cellulose crystallite aggregates being present in an amount of from approximately 5 to 20% by weight and the barium sulfate being present in an amount of from approximately 2 to 10% by weight based on the weight of the radiopaque medium.

6. A radiopaque medium comprising a stable homogeneous aqueous suspension of from 3 to 35% by weight of cellulose crystallite aggregates having an average level-off D.P. of 15 to 375 anhydroglucose units and a water-soluble radiopaque material.

7. A radiopaque medium comprising a stable homogeneous aqueous suspension of approximately 10 to 20% by weight of cellulose crystallite aggregates having an average level-off D.P. of 15 to 375 anhydroglucose units and approximately 1.0 to 0.1% by weight of a water-soluble radiopaque material.

8. A radiopaque medium comprising a stable homogeneous aqueous suspension of from 3 to 35% by weight of cellulose crystallite aggregates having an average level-off D.P. of 15 to 375 anhydroglucose units and sodium 3,5 diacetamido 2,4,6 triiodobenzoate.

9. The method of making a radiograph of living tissue in the alimentary tract comprising orally introducing into the tract a radiopaque medium comprising a stable homogeneous liquid suspension of from 3 to 35% by weight of cellulose crystallite aggregates having an average level-off D.P. of 15 to 375 anhydroglucose units, said liquid selected from the group consisting of aqueous and oleaginous liquids, and passing X-rays through the tract and surrounding tissue against an external surface that is activated by the X-rays passing through the tract and the surrounding tissue to form a picture thereon.

10. The method of making a radiograph of living tissue in the alimentary tract comprising orally introducing into the tract a radiopaque medium comprising a stable aqueous suspension of at least 15% and up to 35% by weight cellulose crystallite aggregates having an average level-off D.P. of 15 to 375 anhydroglucose units and passing X-rays through the tract and surrounding tissue against an external surface that is activated by the X-rays passing through the tract and the surrounding tissue to form a picture thereon.

11. The method of making a radiograph of living tissue in the alimentary tract comprising orally introducing into the tract an aqueous radiopaque medium comprising a stable homogeneous aqueous suspension of cellulose crystallite aggregates having an average level-off D.P. of 15 to 375 anhydroglucose units and barium sulfate, the cellulose crystallite aggregates being present in an amount of from approximately 5 to 20% by weight and the barium sulfate being present in an amount of from approximately 2 to 10% by weight based on the weight of the radiopaque medium and passing X-rays through the tract and surrounding tissue against an external surface that is activated by the X-rays passing through the tract and the surrounding tissue to form a picture thereon.

12. A method of making a radiograph of living tissue in the alimentary tract comprising orally introducing into the tract a radiopaque medium comprising a stable homogeneous aqueous suspension of from 3 to 35% by weight of cellulose crystallite aggregates having an average level-off D.P. of 15 to 375 anhydroglucose units and a water-soluble radiopaque material and passing X-rays through the tract and surrounding tissue against an external surface that is activated by the X-rays passing through the tract and surrounding tissue to form a picture thereon.

13. A method of making a radiograph of living tissue in the alimentary tract comprising orally introducing into the tract a radiopaque medium comprising a stable homogeneous aqueous suspension of approximately 10 to 20% by weight of cellulose crystallite aggregates having an average level-off D.P. of 15 to 375 anhydroglucose units and approximately 1.0 to 0.1% by weight of a water-soluble radiopaque material and passing X-rays through the tract and surrounding tissue against an external surface that is activated by the X-rays passing through the tract and surrounding tissue to form a picture thereon.

14. A method of making a radiograph of living tissue in the alimentary tract comprising orally introducing into the tract a radiopaque medium comprising a stable homogeneous suspension of cellulose crystallite aggregates having an average level-off D.P. of 15 to 375 anhydroglucose units and sodium 3,5 diacetamido 2,4,6 triiodobenzoate and passing X-rays through the tract and surrounding tissue against an external surface that is activated by the X-rays passing through the tract and surrounding tissue to form a picture thereon.

References Cited by the Examiner

UNITED STATES PATENTS

| 2,680,089 | 6/54 | Lowy | 167—95 |
| 2,776,241 | 1/57 | Priewe | 167—95 |
| 3,023,104 | 2/62 | Battista | 167—95 |

OTHER REFERENCES

Annals of the New York Academy of Sciences, vol. 78, Art. 3, July 2, 1959, pp. 707–713 and 720.

JULIAN S. LEVITT, *Primary Examiner.*

LEWIS GOTTS, *Examiner.*